United States Patent [19]

Hurst

[11] Patent Number: 5,321,596
[45] Date of Patent: Jun. 14, 1994

[54] DC/DC/AC POWER SUPPLY FOR A SUBSCRIBER INTERPHASE UNIT

[75] Inventor: David E. Hurst, San Ramon, Calif.

[73] Assignee: Raynet Corporation, Menlo Park, Calif.

[21] Appl. No.: 59,484

[22] Filed: May 17, 1993

Related U.S. Application Data

[63] Continuation of Ser. No. 967,929, Oct. 28, 1992, abandoned, which is a continuation of Ser. No. 674,497, Mar. 25, 1991, abandoned.

[51] Int. Cl.$^5$ .............................................. H02M 7/48
[52] U.S. Cl. ...................................... 363/8; 363/127; 363/163; 379/418
[58] Field of Search ................... 363/8, 71, 127, 163; 379/373, 375, 418; H02M 5/453, 5/458

[56] References Cited

U.S. PATENT DOCUMENTS

| | | | |
|---|---|---|---|
| 4,213,173 | 7/1980 | Link et al. | 363/163 |
| 4,878,163 | 10/1989 | Yamato et al. | 363/8 |
| 5,103,387 | 4/1992 | Rosenbaum et al. | 363/127 |

FOREIGN PATENT DOCUMENTS

| | | | |
|---|---|---|---|
| 178760 | 9/1985 | Japan | 379/418 |
| 214649 | 9/1986 | Japan | 379/418 |
| 247153 | 11/1986 | Japan | 379/418 |
| WO82/02134 | 6/1982 | PCT Int'l Appl. | 363/8 |

OTHER PUBLICATIONS

EPE '89 3$^{rd}$ Eur. Conf. on Power Electr. and App's, pp. 1427–1431, 1989 Aachen Germany.
Intelec 12$^{th}$ Int. TeleComm. Energy Conf. 21, pp. 35–40, Orlando, Fla. USA, Oct. 1990.
Review of the Electrical Comm. Labs, vol. 22, No. 9–10, pp. 818826, Sep. 1974.

Primary Examiner—William H. Beha, Jr.
Attorney, Agent, or Firm—Herbert G. Burkard

[57] ABSTRACT

A DC to DC switch mode power supply for a service subscriber interface unit of a fiber optic network includes a source of DC primary power, a main DC to DC switched mode power supply connected to the source of DC primary power and including switching circuitry and rectifier circuitry for supplying DC operating power to the service subscriber interface unit including central office battery power to at least one subscriber loop connected thereto, and a ringing voltage DC to AC switched mode generator connected to the source of DC primary power and including switching circuitry and synchronous rectification circuitry for generating ringing ringing voltage approximating a sine wave supplied as a reference to the synchronous rectification circuitry. A Johnson counter and resistor capacitor network is preferably employed to convert a reference ringing square wave into a sine wave.

3 Claims, 10 Drawing Sheets

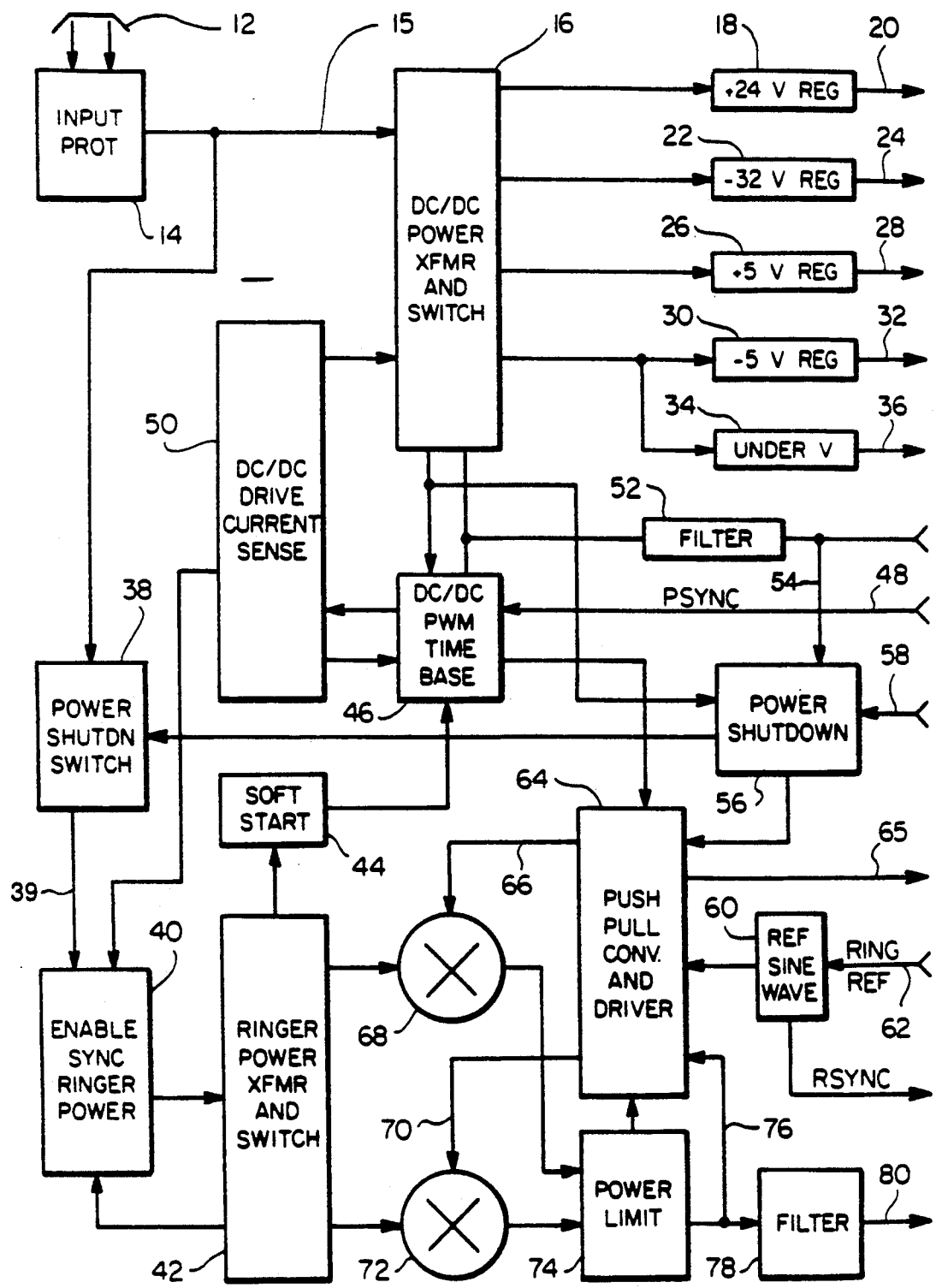
FIG_1

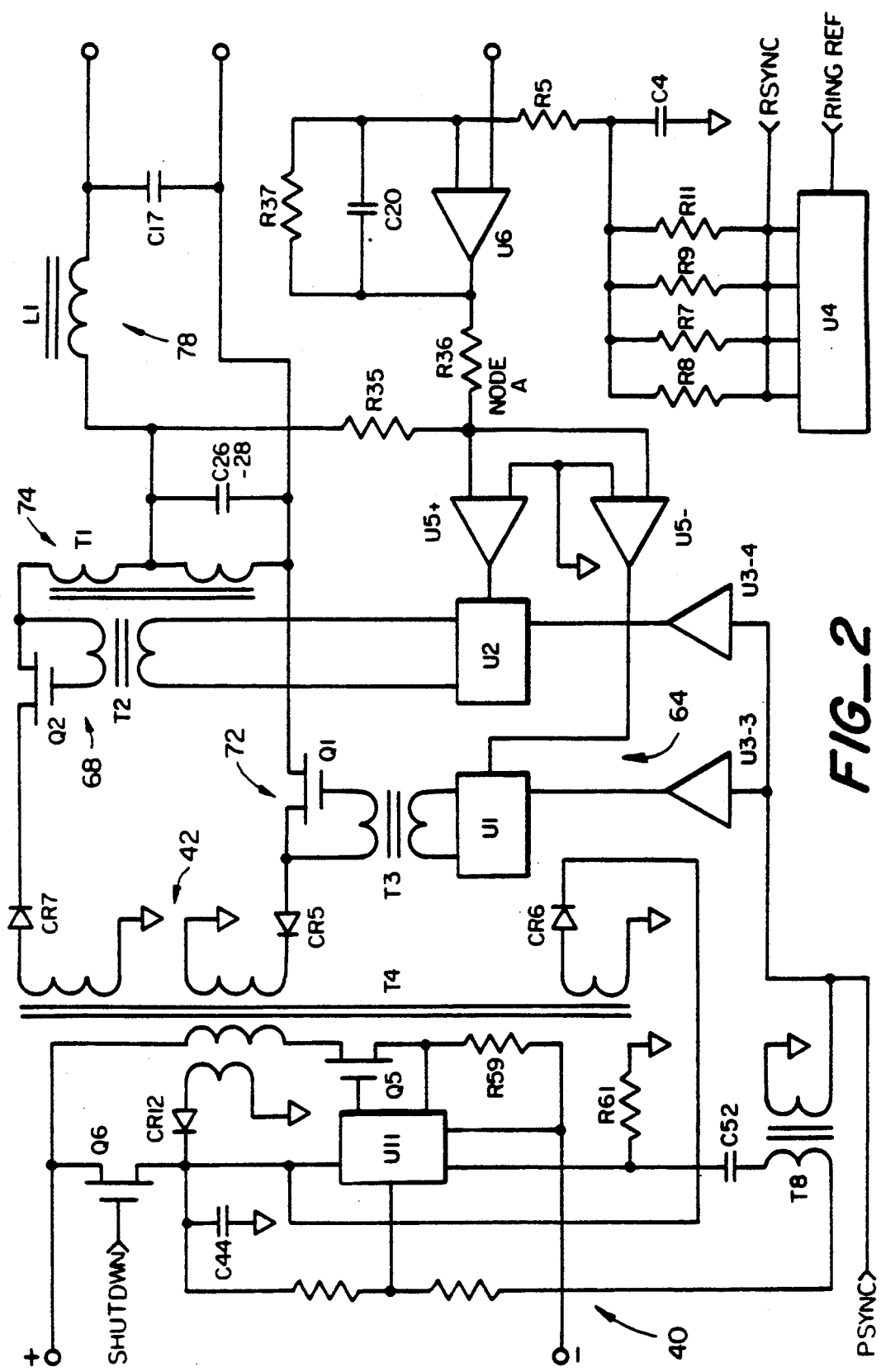
FIG_2

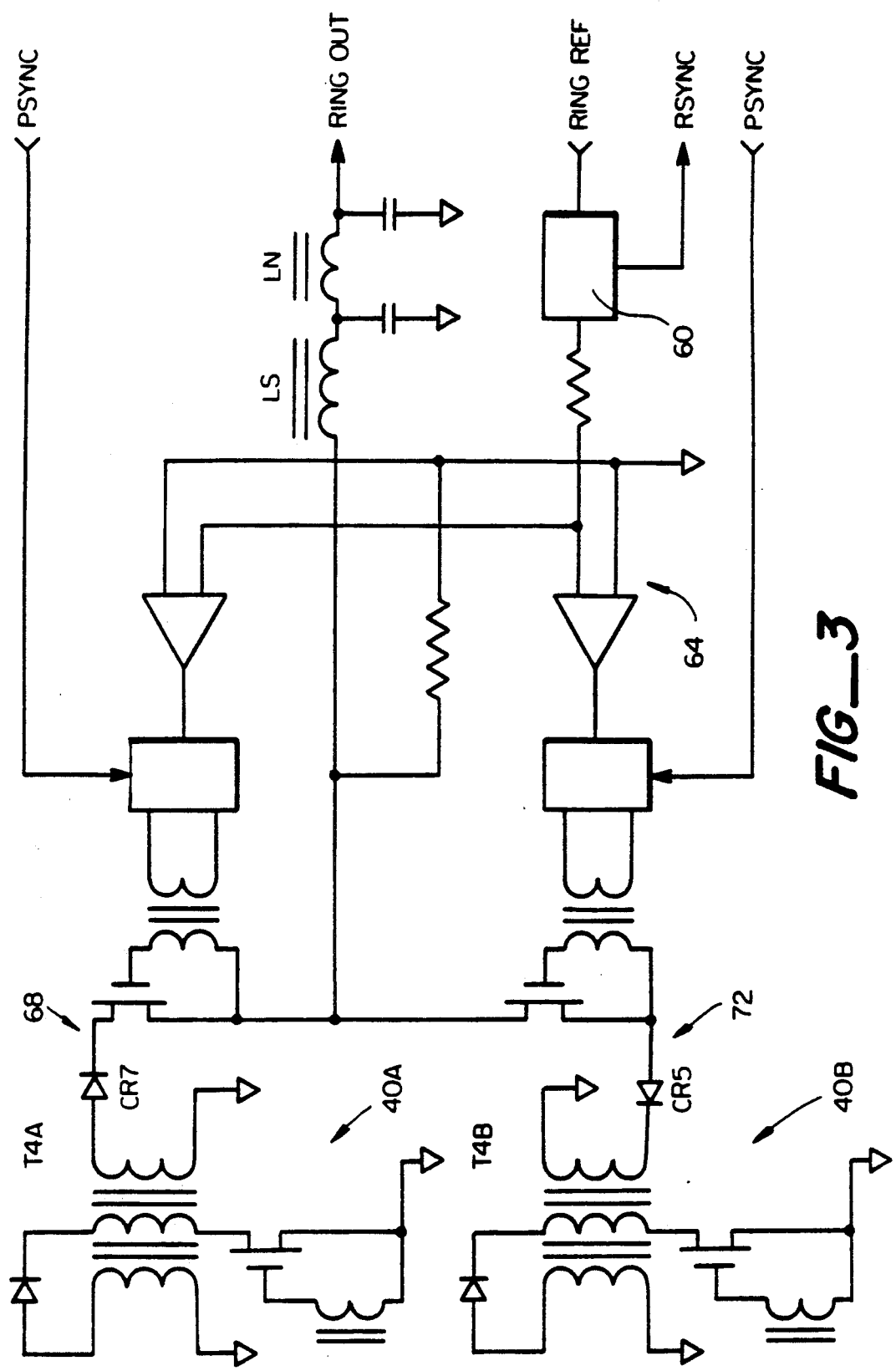
FIG_3

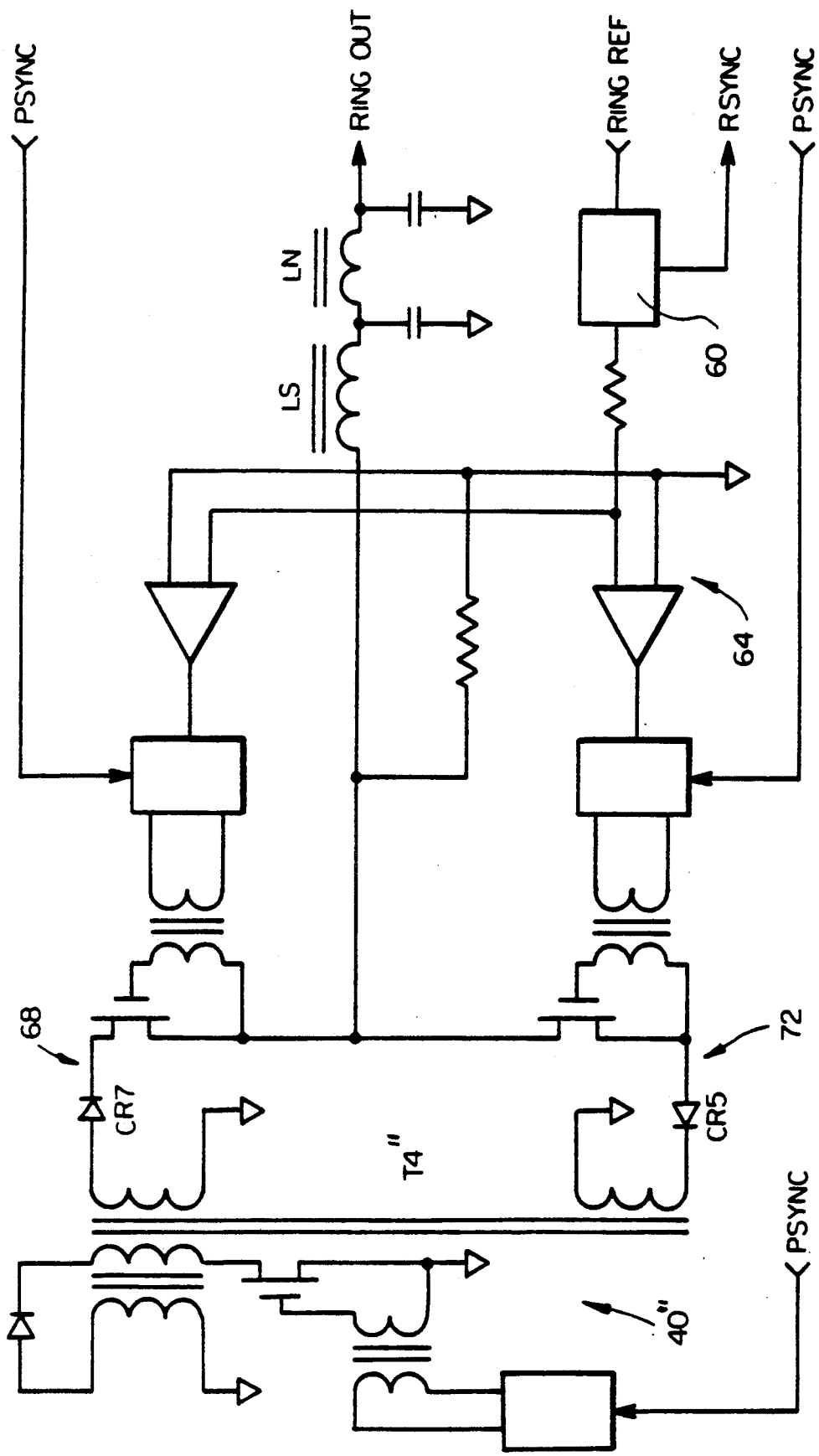
FIG_4

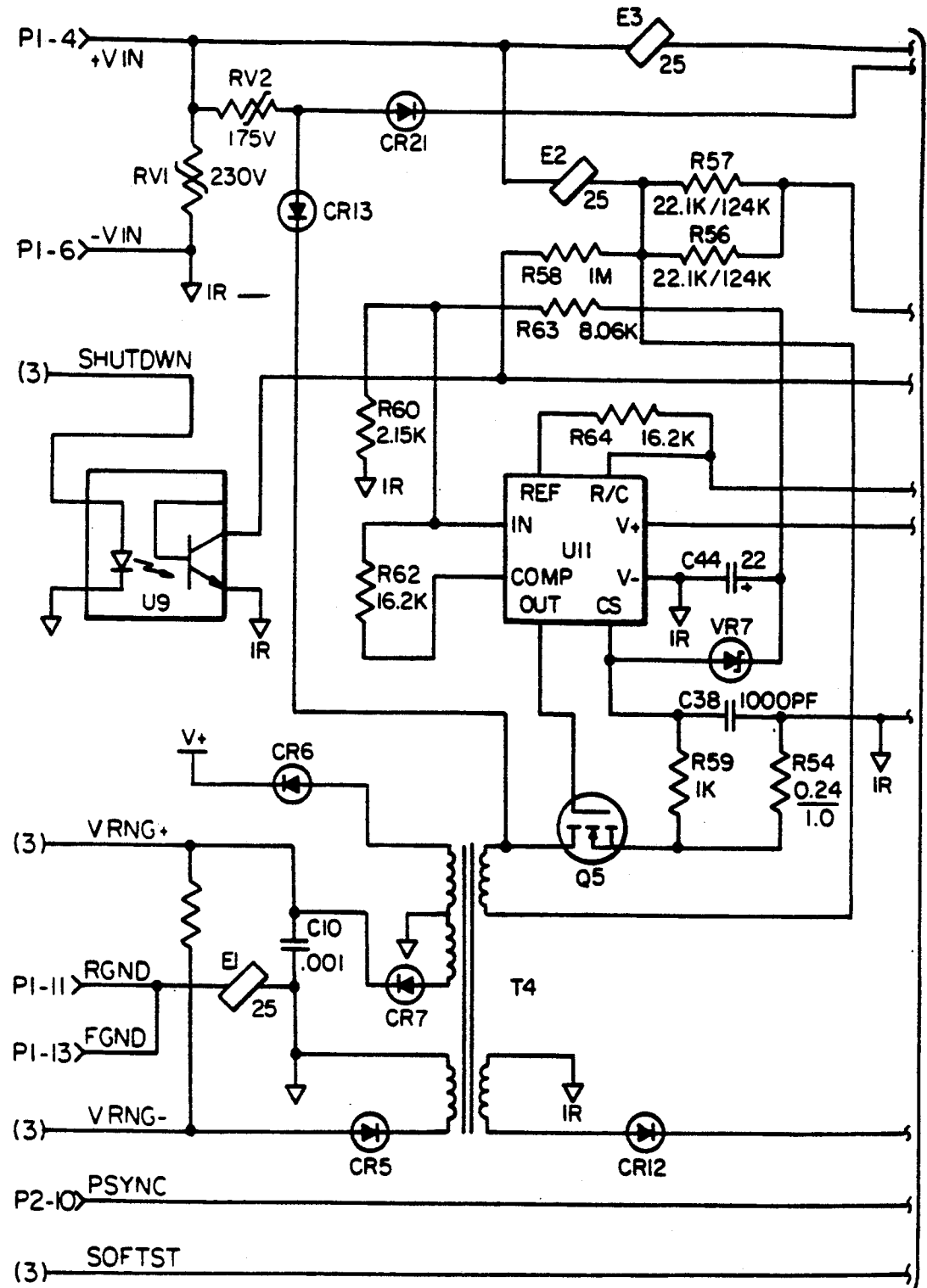
FIG_5A(1)

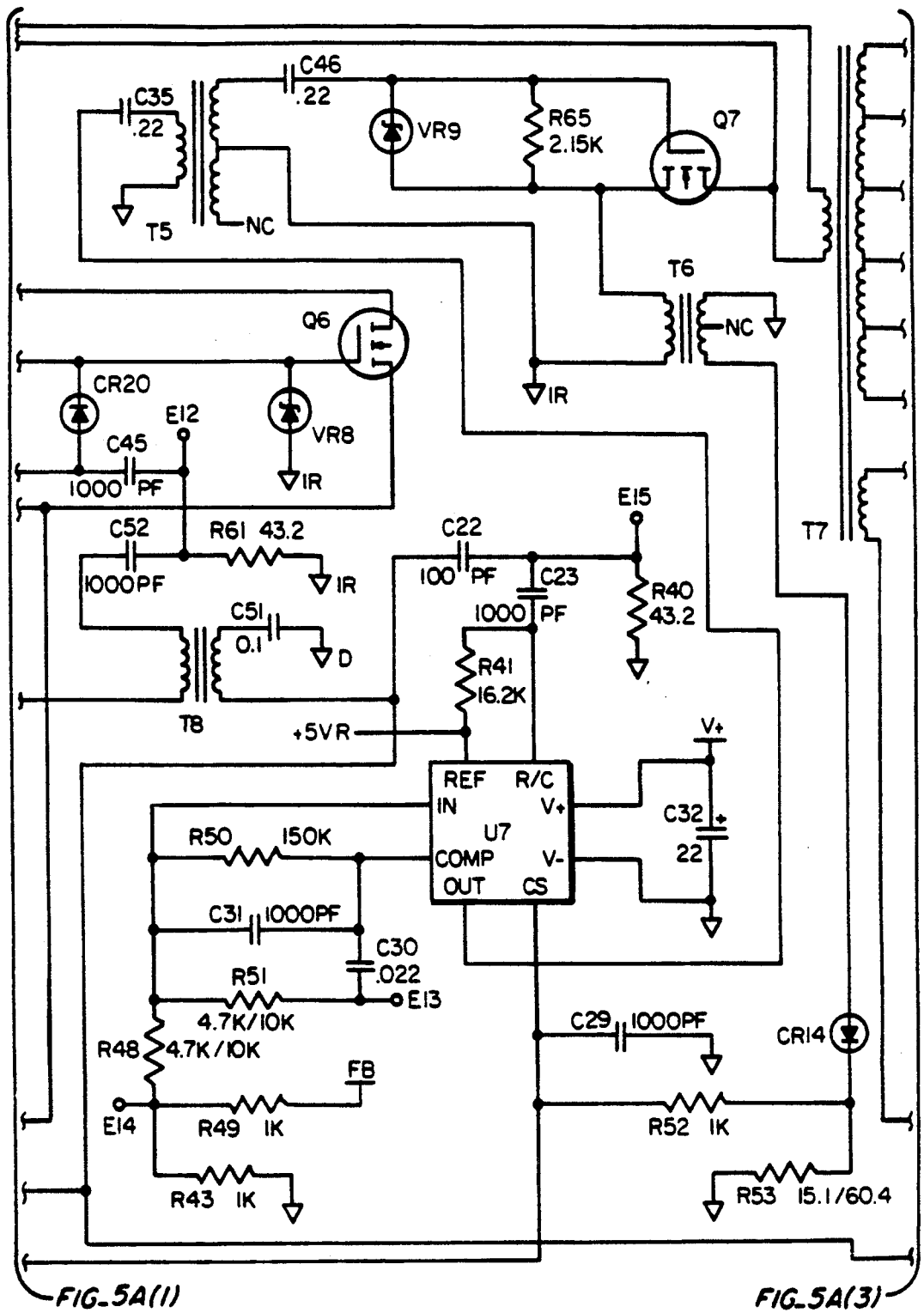
FIG_5A(2)

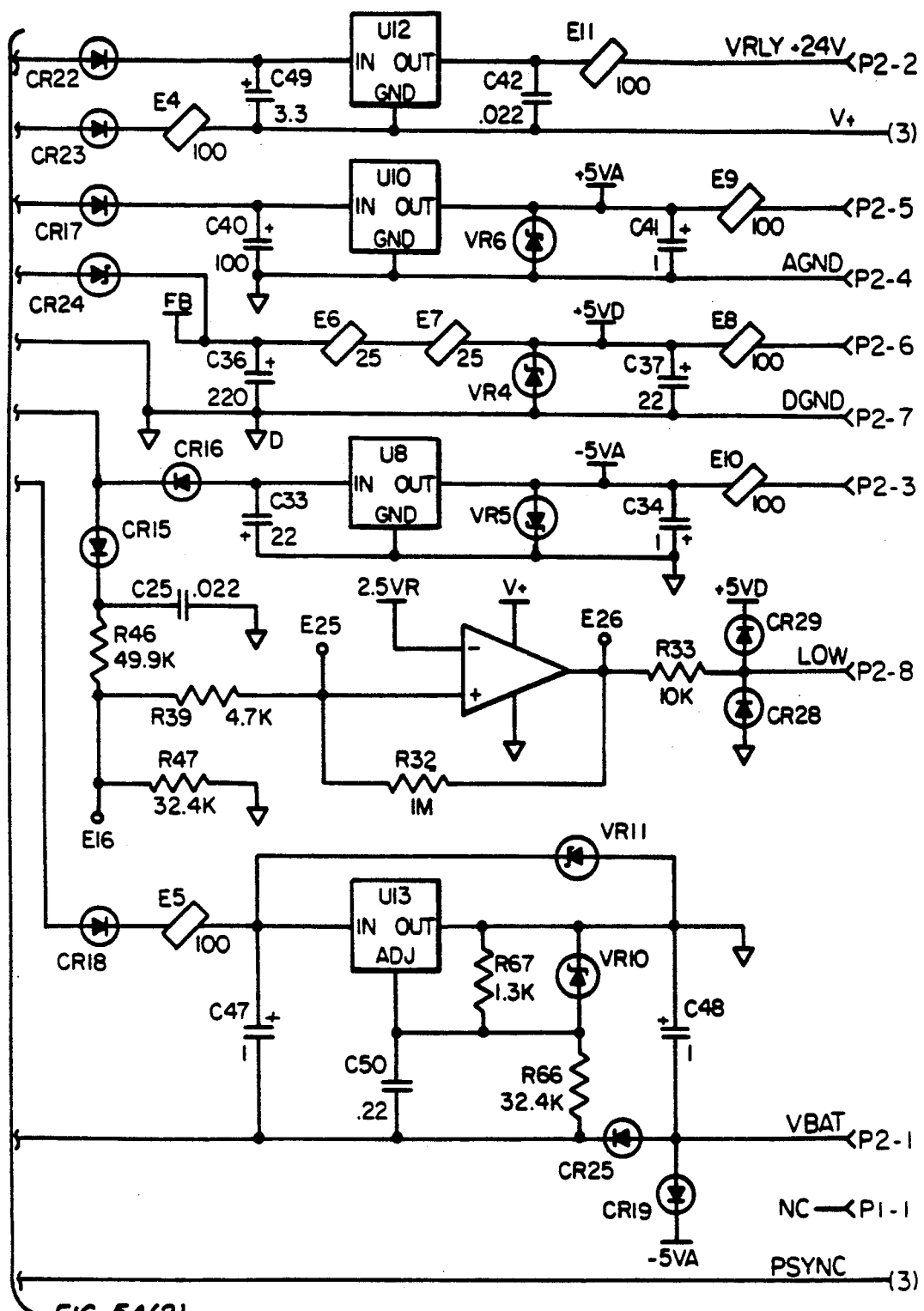
FIG_5A(3)

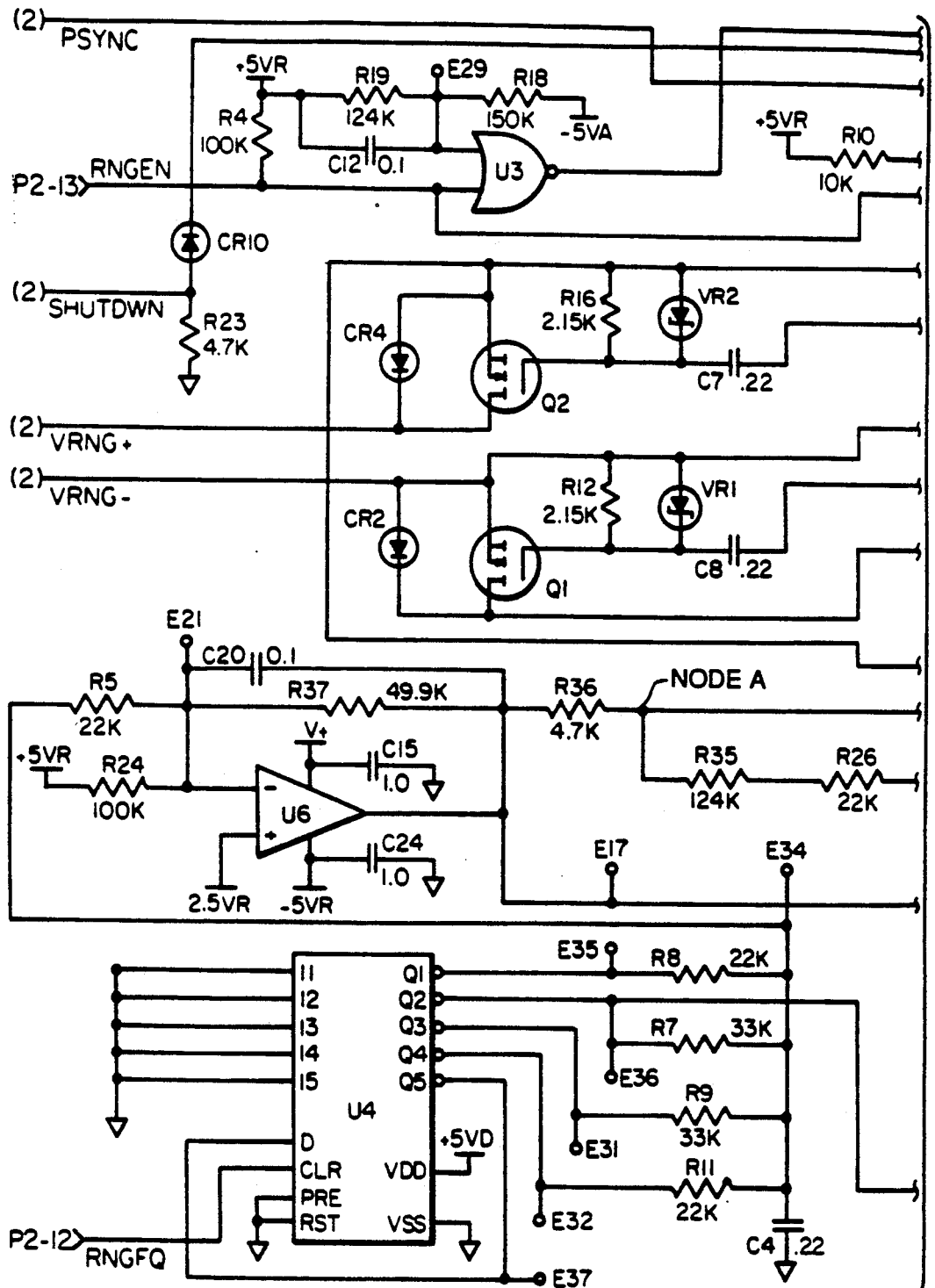
FIG_5B(1)

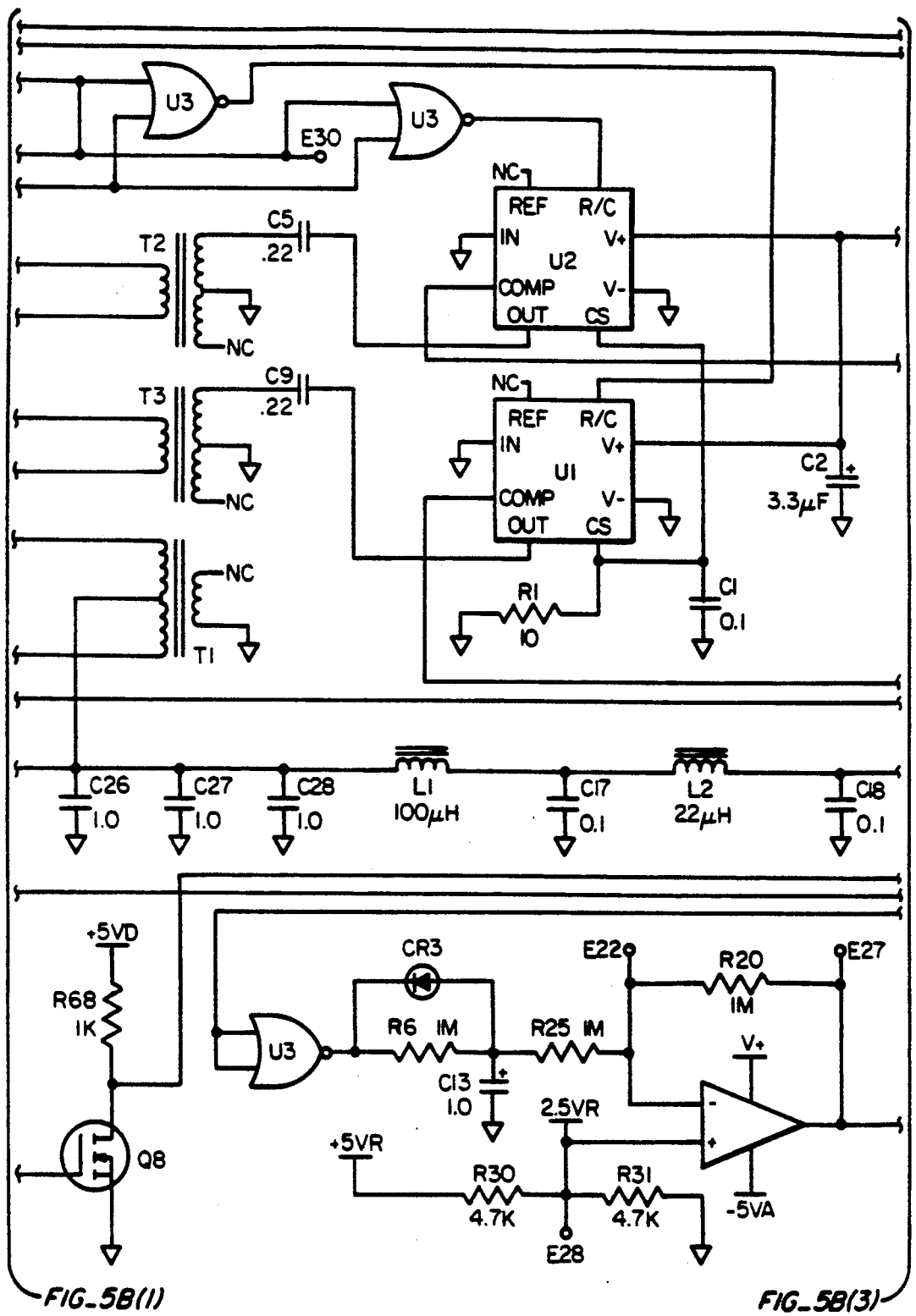
FIG_5B(2)

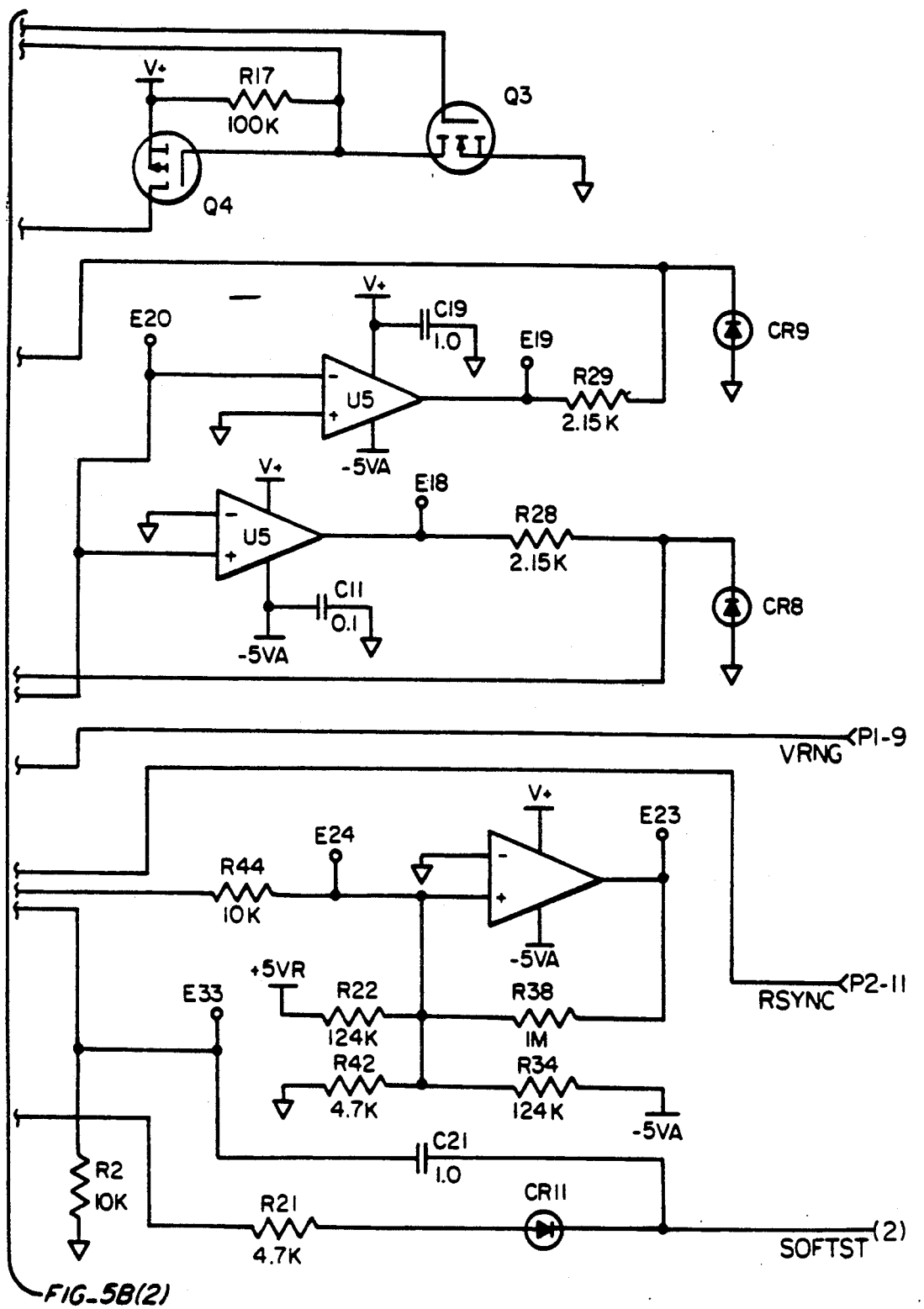
FIG_5B(3)

DC/DC/AC POWER SUPPLY FOR A SUBSCRIBER INTERPHASE UNIT

This application is a file wrapper continuation of application Ser. No. 07/967,929, filed Oct. 28, 1992, now abandoned which is a file wrapper continuation of application Ser. No. 07/674,497 filed Mar. 25, 1991, now abandoned.

FIELD OF THE INVENTION

The present invention relates to electronic power conversion equipment. More particularly, the present invention relates to a DC to DC to AC power supply which has particular application and suitability to remote power supply including on-demand ring voltage generation for use at remotely located subscriber interface units ("SIU") within fiber optic networks.

BACKGROUND OF THE INVENTION

Conventional telephone instruments include an incoming call annunciator: classically a bell, more recently a piezoelectric resonator. In a conventional telephone network, a wire pair extends from a telephone central office location to the service subscriber's premises. Central office battery voltage is typically applied to the wire pair to power the telephone service set, and an AC voltage, nominally 90 volts at 20 Hertz, is applied whenever it is appropriate to ring the telephone bell(s) of the service set(s) at the subscriber's premises, in order to signal an incoming call and induce a user to remove the handset from its cradle, known as an "off hook" condition. The standard telephone service set within the U.S. Bell System includes a bell call annunciator which is broadly resonant at 20 Hertz. In Europe and elsewhere, a frequency of 25 Hertz is commonly employed as the ringing frequency.

Ringing voltage is generated at a central office in a number of ways. A rotary generator or ringing machine consists of a single-speed motor (either AC or DC, depending upon the local power supply). The motor rotates one or more AC generators which generate the desired ringing frequencies and voltages. Magnetic generators operating from the AC power mains have been used to generate ringing signals. Such generators employ resistors, transformers and tuned circuits of inductors and capacitors in order to develop the desired ringing signal. Vibrating reed converters have also been employed to generate ringing voltage from the 48 volt central office battery supply. These converters have included two magnetic coils, an armature and a reed assembly mounted on a frame, and have converted the 48 volts DC into a square wave of the desired frequency for ringing. A filter circuit has modified the square wave to a sine wave. A mechanical interrupter has been employed to divide the ringing generator's signal into alternating ringing and silent periods. One implementation has been a motor for rotating a shaft carrying a number of cams which operate switch contacts that switch the ringing signal on and off. Electronic oscillators have also been employed to generate signals used for ringing. Such circuits have been used in conjunction with private branch exchanges, etc. All of the foregoing approaches have been bulky and have required significant amounts of primary operating power.

Fiber optic networks are proliferating within telecommunications systems. Fiber optic cables are now being extended to "curbside" or within about 100 feet or so of the subscriber's premises. In fiber optic based networks, it is not possible to send central office battery or ringing signals over the fiber optic cable, and these signals must be locally generated at the SIU and delivered to the customer in an appearance functionally identical to the existing "wire plant" network capability. While small, switched mode DC to DC converters are known to be efficient in supplying power, a hitherto unsolved need has arisen for a highly compact, highly efficient DC to DC to AC power supply including an on-demand ringing voltage generator, e.g. for inclusion within an SIU of a fiber optic network.

SUMMARY OF THE INVENTION WITH OBJECTS

A general object of the present invention is to generate and put out a smooth sine wave at a selected frequency within a range of low frequencies and at high conversion efficiency and low cost in a manner which overcomes limitations and drawbacks of the prior art.

Another general object of the present invention is to provide a power supply for a subscriber interface unit (SIU) of an optical fiber network including an on-demand ringing voltage generation apparatus for generating a sine wave power signal in a manner which overcomes limitations and drawbacks of prior approaches.

A more specific object of the present invention is to provide a small, compact and highly efficient power supply for an SIU of a fiber optic network which includes a very compact and efficient DC to AC ringing voltage generator for generating and putting out a ringing signal approximating a sine wave at sufficient power to operate multiple telephone instrument bells and annunciators simultaneously and with a highly efficient circuit contained in a small physical space.

A further object of the present invention is to provide a switched mode DC to DC power supply which includes synchronous push-pull rectification to generate an AC voltage mimicking a reference AC sinewave in a manner particularly suited for use as ringing voltage for multiple telephone instruments.

One more object of the present invention is to provide a highly efficient, externally controllable ringing voltage generator which may be turned on and off in accordance with logic control signals.

Yet another object of the present invention is to provide a DC to DC to AC generator so designed that a range of operating frequencies are directly obtained by adjusting the drive frequency without circuit modification, so that e.g. 20 Hertz ringing signals may be generated for SIUs in North America, while 25 Hertz ringing signals may be generated for SIUs in Europe and in other areas of the world without circuit modification or adjustment.

Still another object of the present invention is to provide a power supply for a subscriber interface unit (SIU) of a fiber optic network which is small and efficient in size, requiring neither physically large inductors nor physically large capacitors.

Yet one more object of the present invention is to make use of readily available, low cost elements, particularly integrated circuit pulse width modulator integrated circuits to realize a push pull synchronous dual quadrant rectifier circuit within a switched power supply DC to AC generator.

Still one more object of the present invention is to employ a switched DC to DC converter and synchronous push pull rectifier to generate an AC power signal closely approximating a sine wave with minimal quantization errors or discontinuities (glitches).

Still another object of the invention is to provide a ring sync signal for the proper timing of the application to or the removal from the subscribers time of the ringing voltage. Since various voltages on the sync wave are presented by counter states either zero crossing or points before or after zero crossing are available for use in timing ring relays or other switching circuitry which applies the ringing voltage to the line. This eliminates the need for analog circuitry to accomplish this function.

Yet another object of the present invention is to provide a switched mode DC to DC power supply for supplying common battery and ringing voltage to at least one service subscriber of an optical fiber network, wherein the ringing voltage closely follows a sine wave and is modulated upon a DC battery voltage applied over a wire pair leading to the service subscriber.

Still one more object of the present invention is to provide a switched mode power supply for supplying power to a subscriber interface unit, including low frequency AC ringing voltage, in a manner which is independent of and isolated from a primary power source which supplies primary power to the power supply.

In accordance with one facet of the present invention, a DC to DC to AC power converter is provided for converting a DC voltage supply to an AC power signal approximating a sine wave at a first frequency F1 via a switched mode DC to DC power supply operating at a second and much higher frequency F2. The DC to DC to AC power converter includes
an input for receiving the DC voltage supply,
a power switching circuit for switching the DC voltage supply at the second frequency F2 and for applying the switched DC voltage supply to primary windings of one or more transformers, the transformers having at least two secondary windings including a push winding and a pull winding,
a push loop including the push winding, a push rectifier and a push switch operating at the F2 frequency, a pull loop including the pull winding,
a pull rectifier and a pull switch operating at the F2 frequency,
a summing junction for summing power delivered from both the push loop and the pull loop and for providing an output,
a sine wave reference signal providing circuit for providing a nominal sine wave at the F1 frequency including a positive half cycle and a negative half cycle,
a push driver controlled by the positive half cycle for controlling the push switch at the F2 frequency substantially in accordance with the positive half cycle, and
a pull driver controlled by the negative half cycle for controlling the pull switch at the F2 frequency substantially in accordance with the negative half cycle.

In one aspect of this facet of the invention the DC to DC to AC power converter further includes a synchronizing circuit for synchronizing operation of the power switching circuit, the push driver and the pull driver with reference to the higher F2 frequency.

In another aspect of this facet of the invention the DC to DC to AC power converter establishes the frequency F1 as being in a range from 10 to 50 Hertz, and operates with the frequency F2 as being in a range from 50,000 Hertz to 1,000,000 Hertz In a further aspect of this facet of the invention the DC to DC to AC power converter is configured to operate in a flyback mode wherein energy stored in the transformer when the power switching means is off is delivered via the push loop and the pull loop, and further comprises a storage capacitor connected at the summing junction.

In one more aspect of this facet of the invention the DC to DC to AC power converter is configured to operate in a forward mode and further comprises a power inductor for energy storage connected at the summing junction.

In a still further aspect of this facet of the present invention the DC to DC to AC power converter further includes logic circuitry connected to control operation of said power switching circuit in accordance with an externally supplied logic control signal.

In one more aspect of this facet of the invention the power switching circuit includes a first pulse width modulator, the push driver includes a second pulse width modulator, and the pull driver includes a third pulse width modulator, the first, second and third pulse width modulators being clocked by said synchronizing circuit at the F2 frequency.

In still another aspect of this facet of the invention the sine wave reference signal providing circuit comprises:
a reference ringing signal input for receiving a digital reference ringing signal having a frequency which is an integral multiple of the frequency F1,
a counter for counting at the digital reference ringing signal and having an output network for generating a successive approximation of a sine wave at the frequency F1, and
an integrator connected to the counter for integrating the successive approximation into the nominal sine wave.

In a related aspect, the counter is a Johnson configuration counter configured as a modulo-10 counter having four low order inverting outputs connected to resistors extending to a common node connecting to an input of the integrator, and the integrator comprises an operational amplifier including a feedback network providing a low pass filter.

In a further related aspect, a ring sync single is connected to each of the resistors connected to the modulo-10 outputs for the proper timing of the application to or the removal from the subscribers time of the ringing voltage.

In accordance with another facet of the present invention, a DC to DC switch mode power supply is provided for for a service subscriber interface unit of a fiber optic network. The power supply includes:
a source of DC primary power,
a main DC to DC switched mode power supply connected to the source of DC primary power and including electronic power switching circuitry, such as enhancement mode field effect transistors and rectifiers for supplying operating power to the service subscriber interface unit including central office battery power to at least one subscriber loop connected thereto, and
a ringing voltage DC to AC switched mode generator connected to the source of DC primary power and including power switching circuitry and synchronous rectification circuitry for generating ringing voltage approximating a sine wave supplied as a reference to the synchronous rectification circuitry.

As an aspect of this facet of the invention the ringing voltage DC to AC switched mode generator operates on an as-needed basis under control of the service subscriber interface unit.

As another aspect of this facet of the invention the ringing voltage DC to AC switched mode generator operates in a self-oscillation mode when the source of DC primary power is first supplied to the DC to DC switch mode power supply so as to generate power for starting said main DC to DC switched mode power supply.

As a still further aspect of this facet of the invention after the service subscriber interface unit is started, it generates 3 power supply sync reference signal PSYNC which synchronizes operation of the main DC to DC switched mode power supply and the DC to AC switched mode generator and also supplies a reference waveform which is used to generate the ringing voltage sinewave.

These and other objects, advantages, aspects and features of the present invention will be more fully understood and appreciated upon consideration of the following detailed description of preferred embodiments, presented in conjunction with the accompanying drawings.

BRIEF DESCRIPTION OF THE DRAWINGS

FIG. 1 is a block diagram of a power supply incorporating the principles of the present invention, e.g. for powering a subscriber interface unit.

FIG. 2 is a simplified schematic circuit diagram of a first preferred embodiment of a DC to DC to AC ring generator circuit within the FIG. 1 power supply, following a flyback configuration in accordance with principles of the present invention.

FIG. 3 is a simplified schematic circuit diagram of a second preferred embodiment of a DC to DC to AC ring generator circuit implementing a forward mode configuration with separate power transformers and an energy storage choke in accordance with principles of the present invention.

FIG. 4 is a simplified schematic circuit diagram of a third preferred embodiment of a DC to DC to AC ring generator circuit implementing a forward mode configuration with a single power transformer and energy storage choke in accordance with principles of the present invention.

FIGS. 5A(1)–(3) and 5B(1)–(3) are a detailed circuit schematic of the FIG. 1 DC to DC switch mode power supply in accordance with principles of the present invention, illustrating in detail an implementation of the FIG. 2 ring generator embodiment.

DETAILED DESCRIPTION OF THE PREFERRED EMBODIMENT

An optical fiber network which extends to the vicinity of the service subscriber's premises requires an optical to electrical signal converter, known as a subscriber interface unit (SIU). It is the function of the SIU to convert telecommunications signaling and data signals into analog control and intelligence signals, most typically voice, fax or modem signals and deliver these analog electrical signals to the subscriber over e.g. a twisted wire pair. Ideally, the SIU is about 100 feet or so from the subscriber's premises, and is therefore necessarily a compact, highly efficient and rugged unit which may be contained in a small weather shed or protection shelter subject to the extremes of the ambient exterior environment, or which may be mounted within an equipment room at the subscriber's premises. The SIU must be very efficient, as the primary power supply available to it may be limited, and it must be very robust, with an expected service life free from maintenance of many years.

With reference to FIG. 1, a power supply 10 for an SIU (not shown) is depicted in functional and structural overview. Circuit details for one preferred implementation of this power supply 10 are provided in the circuit schematics of FIGS. 5A and 5B. The power supply 10, incorporating principles of the present invention, efficiently converts primary DC voltage, either 48 volts or 135 volts, into a plurality of voltages, including ringing voltage, and supplies these voltages to the SIU, and through the SIU to the service subscribers via twisted pairs. The power supply 10 includes an on-demand ringing voltage generator in accordance with principles of the present invention. The ringing voltage generator synthesizes a sine wave at a sub-multiple of a ringing voltage digital driving signal, and puts out AC ringing voltage at a power level sufficient to operate up to twenty telephone bells or other annunciators simultaneously. Approximate ringing power output is 15 watts, continuous duty cycle.

Again referring to FIG. 1, a power input 12 leads from a DC power source, either 48 volts or 135 volts DC. In the case of power being supplied from the AC power mains, an external rectifier and capacitor provide the nominal 135 volts DC. The incoming DC voltage passes through an overvoltage surge protector array 14 which may comprise shunt and series connected metal oxide varistor (MOV) elements as conventionally employed for surge protection. Surge protected power on an internal bus 15 extends to a switch mode main power supply element 16 which includes a +24 volt DC regulator 18 and +24 VDC output 20, a −32 volt DC regulator 22 and −32 VDC output 24, a +5 volt DC regulator 26 and +5 VDC output 28, a −5 volt DC regulator 30 and −5 VDC output 32 and an undervoltage detector circuit 34 which detects an undervoltage condition at the main power supply 16 and provides an alarm signal to the SIU over an output line 36. In accordance with good engineering practices, a +5 volts DC analog supply bus is kept separate from a +5 volts DC digital supply bus.

The internal power bus 15 also leads to a power shutdown switch 38 which generates and supplies an enable power signal via a line 39 to a ringer power driver circuit 40. The ringer power driver circuit includes a pulse width modulating element which switches the DC power into alternating drive current and supplies the drive current to e.g. an enhancement mode power FET switch in series with a primary of a transformer within a ringer power transformer and switch block 42. Output from the ringer power transformer and switch block 42 is taken through a soft start block 44 to control operation of a DC/DC pulse width modulator time base generator block 46 which supplies the basic timing signals to all of the elements of the power supply 10. The time base generator block 46 is supplied with a reference sync signal PSYNC from the SIU over a line 48. The PSYNC reference signal is most preferably a logic signal approximating a square wave, and has a frequency of e.g. 120 KHz to 750 KHz, and most preferably about 128 KHz. The time base generator block 46 applies drive to a DC/DC drive sensing circuit 50 which senses drive current applied to the main DC/DC power transformer and switch 16. PSYNC from the time base generator 46 is also supplied to the ringer power driver circuit 40.

A filter 52 filters and puts out +5 VDC digital on a line 54 to a power shutdown circuit 56 and to other digital circuitry within the power supply 10. Another input 58 to the power shutdown circuit 56 carries a ring enable logic signal from the SIU. This signal, as processed by the power shutdown circuit 56, causes the power shutdown switch 38 to be operated externally by the SIU, so that ringer voltage is generated only when needed, thereby conserving power.

The DC/DC/AC ringer power converter receives a ring frequency signal over a line 62 from the SIU, typically 200 Hz for North America, and 250 Hz for Europe and other countries employing a 25 Hz ringing signal frequency. The ring frequency signal on the line 62 (which is a digital logic signal or square wave) is applied to a reference sine wave generator circuit 60 which generates a reference sine wave e.g. at one tenth the frequency of the ring frequency signal, in a manner which will be explained in greater detail hereinafter. The sine wave generator circuit 60 also generates a ring sync signal RSYNC. RSYNC provides a ring sync signal for the proper timing of the application to or the removal from a subscriber's time of the ringing voltage. Since various voltages on the sync wave are presented by counter states either zero crossing or points before or after zero crossing are available for use in timing ring relays or other switching circuitry which applies the ringing voltage to the line. This eliminates the need for analog circuitry to accomplish this function.

The reference sine wave is also applied as a reference signal input to a dual quadrant push pull ring converter and driver 64 along with sync from the time base generator 46 and an enable signal from the power shutdown circuit 56. The push pull ring converter and driver 64 generates a two-quadrant push phase drive signal, and a two-quadrant pull phase drive signal and applies them to control push and pull two quadrant synchronous rectifiers. The plus control signal (e.g. "push") is applied over a line 66 to a push phase synchronous rectifier 68, while the minus control signal (e.g. pull phase) is applied over a line 70 to control a pull phase synchronous rectifier 72. Outputs from the push phase synchronous rectifier 68 and pull phase synchronous rectifier 72 are combined in a power combining and limiting circuit 74. A ringer loop feedback signal is also supplied from the output of the power limiting circuit 74 to the push pull converter and driver circuit 64 over a feedback path 76. As will be explained hereinafter in greater detail, the low frequency reference sinewave and the feedback signal are summed to zero and any resultant error signal controls which synchronous rectifier will be operating at any particular time.

A filter 78 filters the output of the limit circuit 74 and supplies ringing current at an output 80. The ringing current is available selectively on demand from the SIU. The ringing voltage is approximately 200 Volts peak to peak, is modulated upon the −32 volt DC "central office" battery voltage put out at the output 24 by the main power supply, and thus has peak to peak excursions relative to earth ground return of +68 volts and −132 volts.

The FIG. 1 ringer circuit, comprising the elements 42, 64, 68, 72, 74 and 76, may be configured in either a flyback mode, as shown in FIG. 2 and 5A–5B, or it may be configured in a forward mode, as shown in FIGS. 3 and 4, for example.

Turning now to FIG. 2, a simplified schematic of the ringing voltage generator circuit is provided. Components and elements have been given reference letters and numerals in FIG. 2 which generally correspond to the reference letters and numerals applied to the same elements in the detailed circuit schematic of FIGS. 5A(1)–(3) and 5B(1)–(3). Referring now to FIGS. 2, 5A and 5B, the driver circuit 40 includes a pulse width modulator U11 which drives an enhancement mode field effect power transistor Q5 as at a switching rate established by the PSYNC square wave driving signal, nominally 128 KHz. Current flowing through the primary winding of the ringing transformer T4 is sensed through the series resistor R59 and fed back to control operation of the PWM U11. The pulse transformer T8 and blocking capacitor C52 enable the PSYNC driving signal to be applied to operate the PWM U11. The function of the circuit 40 is to dump energy into the ringer power transformer T4 by causing a magnetic field to build up when the FET switch Q5 is closed. A feedback winding of the transformer T4 enables the switch Q5 to open and close in a free running mode when power is first applied, and before the SIU is capable of generating the PSYNC reference signal. This enables the circuit 40 to generate an initial or staring voltage supplied to the V+ bus which enables the other circuitry of the power supply 10 to begin to function in order to generate the power supplies required for operation of the SIU.

After the FET switch Q5 is opened, the field collapses and power from the field is drawn through one or the other of the synchronous rectifiers 68 or 72. The positive quadrants synchronous rectifier 68 includes a series loop of a T4 secondary winding, half wave diode rectifier CR7, and an enhancement mode power FET Q2 driven by a pulse transformer T2 operating in the linear mode. Direct current rectified by the diode CR7 is selectively passed by the FET Q2 and delivered to one winding of a current sense transformer T1. The pulse transformer T2 is driven by a pulse width modulator U2.

The negative quadrants synchronous rectifier 72 similarly includes a series loop of another T4 secondary winding, a half wave rectifier diode CR5, and an enhancement mode power FET Q1 driven by another pulse transformer T3, The pulse transformer T3 is in turn driven by a pulse width modulator circuit U1.

An analog comparator circuit comprising U5+ and U5− generates and puts out control currents to the PWMs U1 and U2 in accordance with an error signal at a summing junction labelled NODE A. The error signal is the difference between the reference low frequency sine wave supplied via a resistor R36 and a feedback signal supplied through a feedback resistor R35. Depending upon the sign of the difference, the comparator U5 selects the appropriate PWM, either PWM U1 or PWM U2 to cause a signal to be passed by the respective FET switch, either Q1 or Q2, so that the voltage at the output is forced to follow the reference waveform fed into NODE A. The ratio of the resistors R35 and R36 establishes the voltage ratio between the reference voltage and the output voltage, and the respective resistances scale the error signal to be within the dynamic range of the comparator U5. In operation, if the error signal tends to become positive, this will cause the positive voltage quadrants loop comprising CR7 and Q2 to turn off, and the negative quadrants loop comprising CR5 and Q1 to turn on. The reverse situation also obtains. The width of discrete pulses put out by each loop is fixed by the respective PWM U1 or U2, and has a maximum duration fixed by the PSYNC clock period. Thus, the control loop, starting at NODE A turns on either the positive quadrants loop switch Q2 or the negative quadrants loop switch Q1 for as long as necessary to force NODE A to remain at zero volts.

While the reference sinewave generator 60 may follow a number of forms, it most preferably includes a type CD 4018 counter circuit configured as a Johnson counter in a decade arrangement. The modulo-10 Johnson counter architecture is a known configuration which is implemented with a shift register, and puts out essentially a Gray code in which adjacent counts result only in a single bit change. The following table illustrates the output pattern put out by the counter U4. This pattern is used selectively to add and subtract resistances of shunt resistors R8, R7, R9 and R11 in parallel:

TABLE 1

| |
|---|
| 0 0 0 0 0 |
| 0 0 0 0 1 |
| 0 0 0 1 1 |
| 0 0 1 1 1 |
| 0 1 1 1 1 |
| 1 1 1 1 1 |
| 0 1 1 1 1 |
| 0 0 1 1 1 |
| 0 0 0 1 1 |
| 0 0 0 0 1 |

Resistors R8 and R11 are e.g. 22 Kilohms, while resistors R7 and R9 are 33 Kilohms. A resistor ratio of 1/1.3 has been found to result in an output waveform from the modulo-10 Johnson counter U4 which closely reproduces a sinewave. The integration capacitor C4 causes the resultant waveform put out by the counter U4 to follow a locus approximating a sinewave over four quadrants. An operational amplifier U6 is configured as an integrator, and it smooths the resultant sine wave and delivers it to NODE A via the resistor R36. RSYNC is connected to each of R8, R7, R9, and R11 to generate an appropriate ring sync.

A negative feedback network connected across the operational amplifier U6 and comprising a 0.1 microfarad capacitor C20 and a 50 Kilohm resistor R37 establishes a low pass filter which passes signals up to about 50 Hz, but which eliminates high frequencies, including any high frequency aliases or spurs otherwise coming out of the Johnson counter U4. Thus, it will be appreciated that the square wave ringing reference signal entering the Johnson counter U4 is ten times the resultant sine wave, and can range from 100 Hz to 500 Hz, resulting in an AC sinewave output of the ringing generator 60 of 10 Hz to 50 Hz. Differing ringing frequencies may thereby be readily generated and put out without requiring any modification or "tuning" of the ringing voltage generator circuit 60. In North America the nominal ringing frequency is 20 Hz, and the reference square wave is 200 Hz, while in Europe and elsewhere in the world, for a 25 Hz ringing voltage, a 250 Hz reference square wave is directly applied at the ringing generator input.

As noted in the preferred embodiment depicted in FIG. 2, the ringing voltage transformer T4 is operated in a flyback mode wherein during the field development half cycle in which the driving circuit 40 is on, the synchronous rectifier loops 68 and 72 are biased off, and only come to life after the power driver circuit 40 has shut down. In the flyback mode, a filter includes an input capacitance C26, C27, and C28 followed by a relatively small smoothing choke L1 and an output capacitance C17.

A forward mode configuration is illustrated in FIG. 3 wherein the positive quadrants loop 68' includes a driving circuit 40A, and the negative quadrants loop 72' includes a driving circuit 40B. The power transformers T4-A and T4-B may be made much smaller than the flyback mode transformer T4, and the drivers 40A and 40B and associated transformers T4-A and T4-B are connected so that the selected one of the diodes CR7 and CR5 will conduct on the forward or field building half cycle. In the forward mode, energy storage is provided by a storage inductor LS which feeds the low pass filter 78. A forward mode configuration using a single transformer T4" and a single driving circuit 40" is shown in FIG. 4.

When power is first applied, the power supply 10 and the SIU have not yet come to life. Incoming current on the internal bus 15 passes through a FET switch Q6, and with no signal to shut down this switch, it conducts and passes the current to charge up a large value capacitor C44. When the voltage across the capacitor C44 reaches a level fixed by a zener diode VR7, the ringer driver circuit 40 comes to life and causes a field to build in the ringer transformer T4. The feedback winding and diode CR 12 provide for free oscillation of the circuit 40 during this initial phase. A secondary winding and diode CR6 then provide a starting voltage V+ which is applied to start operation of a pulse width modulator U7 which in turn starts the main power supply comprising a drive transformer T5, driver FET switch Q7 and primary of main transformer T7.

The main DC to DC converter now turns on, and generates the voltages noted in FIG. 1 and applies those voltages throughout the SIU. When +5 volts DC digital comes up, an optoisolator U9 shuts off operation of the ringer generator driver 40 by turning off the FET switch Q6. At the same time, the SIU is receiving power, and begins to generate both the PSYNC and RINGREF square waves which are supplied back to the power supply 10. During operation, current demands are monitored in both the main DC to DC converter and within the ringing generator driver, and output power is controlled by the pulse width modulators U7 and U11. As is well understood in fiber optic technology, during periods of slack traffic, the laser at the SIU is dimmed, thereby extending the service life thereof.

When a need arises for ringing voltage, logic circuits U3-1, U3-3 o and U3-4 cause the drivers U1 and U2 to come back to life and also turn on the switch Q6. The switch Q6 applies power to the ringer driver 40, and ringing voltage is generated and put out. The duration of the ringing voltage on interval is controlled by this logic circuitry under the direction of the SIU. Thus, the ringing power supply is turned on and off during each ring interval of a ringing sequence, further conserving power.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A DC to AC power converter for converting a DC voltage supply to an AC voltage approximating a sine wave at a first frequency F1 via a switched mode DC to DC power supply operating at a second and higher frequency F2, comprising:

an input for receiving the DC voltage supply;

a power switching circuit for switching the DC voltage supply at the second frequency F2 and for applying the switched DC voltage supply to primary windings of one or more transformers, said one or more transformers having at least a push secondary winding and a pull secondary winding;

a push loop including the push secondary winding, a push rectifier and a push switch operating at the second frequency F2;

a pull loop including the pull secondary winding, a pull rectifier and a pull switch operating at the second frequency F2;

a summing junction for summing power delivered from both the push loop and the pull loop and for providing an output;

a sine wave reference signal means for providing a nominal sine wave at the first F1 frequency including an F1 positive half cycle and an F1 negative half cycle, said means comprising:

a reference ringing signal input for receiving a reference ringing signal having a frequency which is an integral multiple of the first frequency F1, counter means for counting at the reference ringing signal frequency and having an output network means for generating a successive approximation of a sine wave at the first frequency F1, and integrator means connected to the counter means for integrating the successive approximation into the nominal sine wave;

a push driver controlled by the positive half cycle for controlling the push switch at the second frequency F2 substantially in accordance with the F1 positive half cycle; and a pull driver controlled by the negative half cycle for controlling the pull switch at the second frequency F2 substantially in accordance with the F1 negative half cycle.

2. The DC to AC power converter set forth in claim 1 wherein the counter means comprises a Johnson counter and the integrator means includes an operational amplifier including a feedback network comprising a low pass filter.

3. The DC to AC power converter set forth in claim 2 wherein the reference ringing signal is ten times F1 and wherein the Johnson counter is configured as a modulo-10 counter having four low order inverting outputs connected to resistors extending to a common node connecting to an input of the integrator means.

* * * * *

UNITED STATES PATENT AND TRADEMARK OFFICE
CERTIFICATE OF CORRECTION

PATENT NO. : 5,321,596
DATED : June 14, 1994
INVENTOR(S) : Hurst, David E.

It is certified that error appears in the above-indentified patent and that said Letters Patent is hereby corrected as shown below:

On the cover page, Item[54] and Column 1, line 2, replace "INTERPHASE" by --INTERFACE --.

Signed and Sealed this

Eighth Day of November, 1994

Attest:

BRUCE LEHMAN

Attesting Officer     Commissioner of Patents and Trademarks